US012706838B2

(12) United States Patent
Vasseur

(10) Patent No.: US 12,706,838 B2
(45) Date of Patent: Aug. 11, 2026

(54) PREDICTIVE FAST REROUTE

(71) Applicant: Cisco Technology, Inc., San Jose, CA (US)

(72) Inventor: Jean-Philippe Vasseur, Combloux (FR)

(73) Assignee: Cisco Technology, Inc., San Jose, CA (US)

( * ) Notice: Subject to any disclaimer, the term of this patent is extended or adjusted under 35 U.S.C. 154(b) by 577 days.

(21) Appl. No.: 18/096,749

(22) Filed: Jan. 13, 2023

(65) Prior Publication Data

US 2024/0243995 A1 Jul. 18, 2024

(51) Int. Cl.
*H04L 45/00* (2022.01)
*H04L 45/28* (2022.01)

(52) U.S. Cl.
CPC .............. *H04L 45/36* (2013.01); *H04L 45/22* (2013.01); *H04L 45/28* (2013.01)

(58) Field of Classification Search
CPC ......... H04L 45/22; H04L 25/28; H04L 45/36; H04L 45/50
See application file for complete search history.

(56) References Cited

U.S. PATENT DOCUMENTS 7,586,841 B2 9/2009 Vasseur
7,859,993 B1 12/2010 Choudhury et al.
9,686,182 B2 6/2017 Nakash
10,567,252 B1 * 2/2020 Mukhopadhyaya .......................... H04L 43/0805
10,721,158 B2 7/2020 Vasseur et al.
10,728,087 B2 7/2020 Agarwal et al.
11,398,958 B2 7/2022 Vasseur et al.
2015/0304214 A1 * 10/2015 Ye ......................... H04L 45/507 370/392
2016/0219065 A1 * 7/2016 Dasgupta ............ H04L 63/1441
2021/0258243 A1 * 8/2021 Narasimhan ............ H04L 41/04
2022/0321458 A1 * 10/2022 Lin ...................... H04L 41/0668
2023/0015709 A1 * 1/2023 Bisht ...................... H04L 47/127
2023/0261980 A1 * 8/2023 Padi ......................... H04L 43/16 370/225
2023/0412488 A1 * 12/2023 Kumar Mishra ....... H04L 45/02
2024/0235984 A1 * 7/2024 Chunduri .............. H04L 45/302

OTHER PUBLICATIONS

Pan, et al., "Fast Reroute Extensions to RSVP-TE for LSP Tunnels", Network Working Group, Request for Comments: 4090, May 2005, 38 pages, The Internet Society.
Vasseur, et al., "IGP Routing Protocol Extensions for Discovery of Traffic Engineering Node Capabilities", Network Working Group, Request for Comments: 5073, Dec. 2007, 13 pages.
"Fast Reroute", online: https://en.wikipedia.org/wiki/Fast_Reroute, Jan. 2021, accessed Dec. 29, 2022, 1 page, Wikimedia Foundation, Inc.

* cited by examiner

*Primary Examiner* — Donald L Mills
(74) *Attorney, Agent, or Firm* — Lee & Hayes, P.C.

(57) ABSTRACT

In one embodiment, a router in a network reports, a supervisor, capabilities of the router to support fast reroute. The router receives a prediction model from the supervisor that is able to predict failures along a path in the network. The router predicts, using the prediction model, a failure along a primary path in the network that is currently being used by the router to send traffic. The router performs, in advance of the failure predicted by the router, a fast reroute of at least a portion of the traffic from the primary path to a backup path in the network.

20 Claims, 10 Drawing Sheets

PREDICTIVE FAST REROUTE

TECHNICAL FIELD

The present disclosure relates generally to computer networks, and, more particularly, to predictive fast reroute.

BACKGROUND

Over the past few decades, a number of recovery mechanisms have been designed and deployed in enterprise and service providers networks. Of these, the most commonly used ones include: recovery (protection and restoration) at the optical layers, optimization of the convergence time of an Interior Gateway Protocol (IGP) such as Intermediate-System-to-Intermediate-System (ISIS) and Open Shortest Path First (OSPF), Internet Protocol (IP) Fast Reroute (FRR) and Multiprotocol Label Switching (MPLS) Traffic Engineering (TE) Fast Reroute (FRR).

Indeed, MPLS TE FRR has been deployed in many networks so as to achieve recovery times on the order of milliseconds, including the detection of the failure and traffic rerouting along a next-hop (link protection) or next-next-hop (node protection) backup tunnel. Such backup tunnels may be provisioned without bandwidth guarantees or with bandwidth guarantees (also referred to as MPLS TE FRR with bandwidth protection), where backup tunnels path may be computed on-line using Constrained Shortest Path First (CSPF) or via a Path Computation Element (PCE) in the network.

One common factor among all of the above recovery mechanisms is that they are all reactive in nature, meaning that rerouting of traffic onto a backup path is only possible after receiving signaling that there is a link or node failure along the primary path. In addition, these techniques are also completely agnostic as to the quality of experience (QoE) of any given application whose traffic is routed over the failed path.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
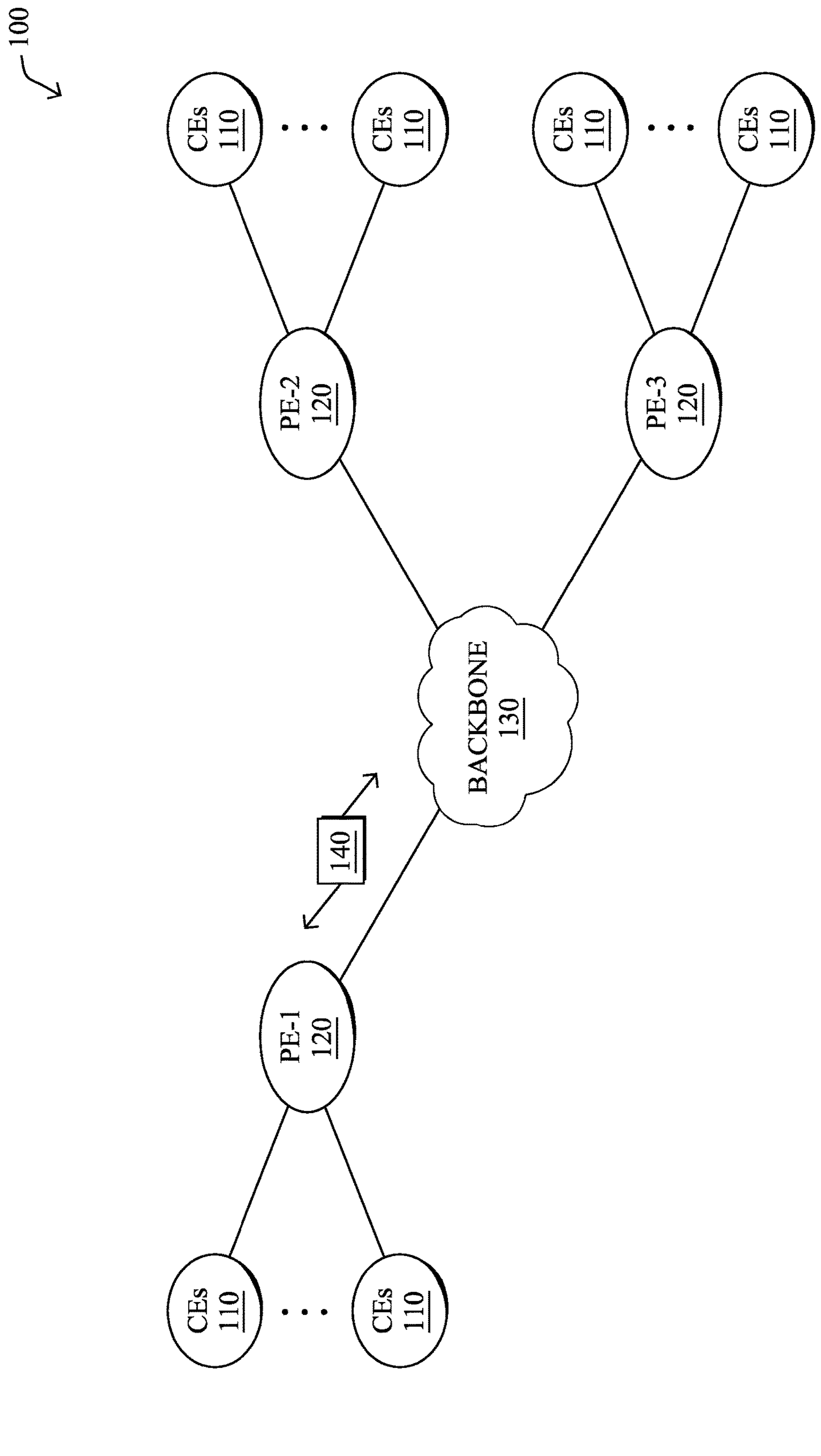
FIGS. 1A-1B illustrate an example communication network.

According to one or more embodiments of the disclosure, a router in a network reports, a supervisor, capabilities of the router to support fast reroute. The router receives a prediction model from the supervisor that is able to predict failures along a path in the network. The router predicts, using the prediction model, a failure along a primary path in the network that is currently being used by the router to send traffic. The router performs, in advance of the failure predicted by the router, a fast reroute of at least a portion of the traffic from the primary path to a backup path in the network.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection). Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
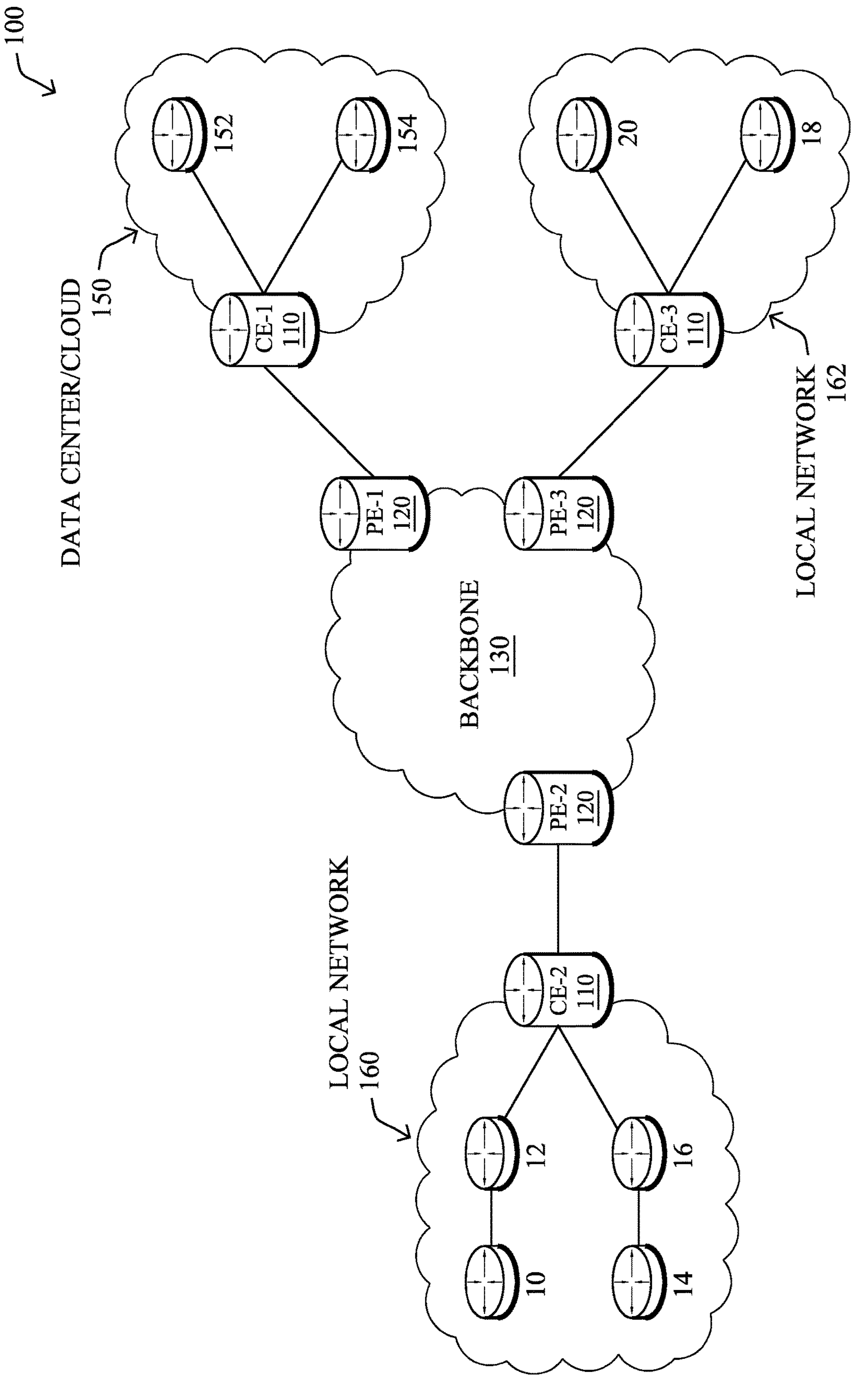

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
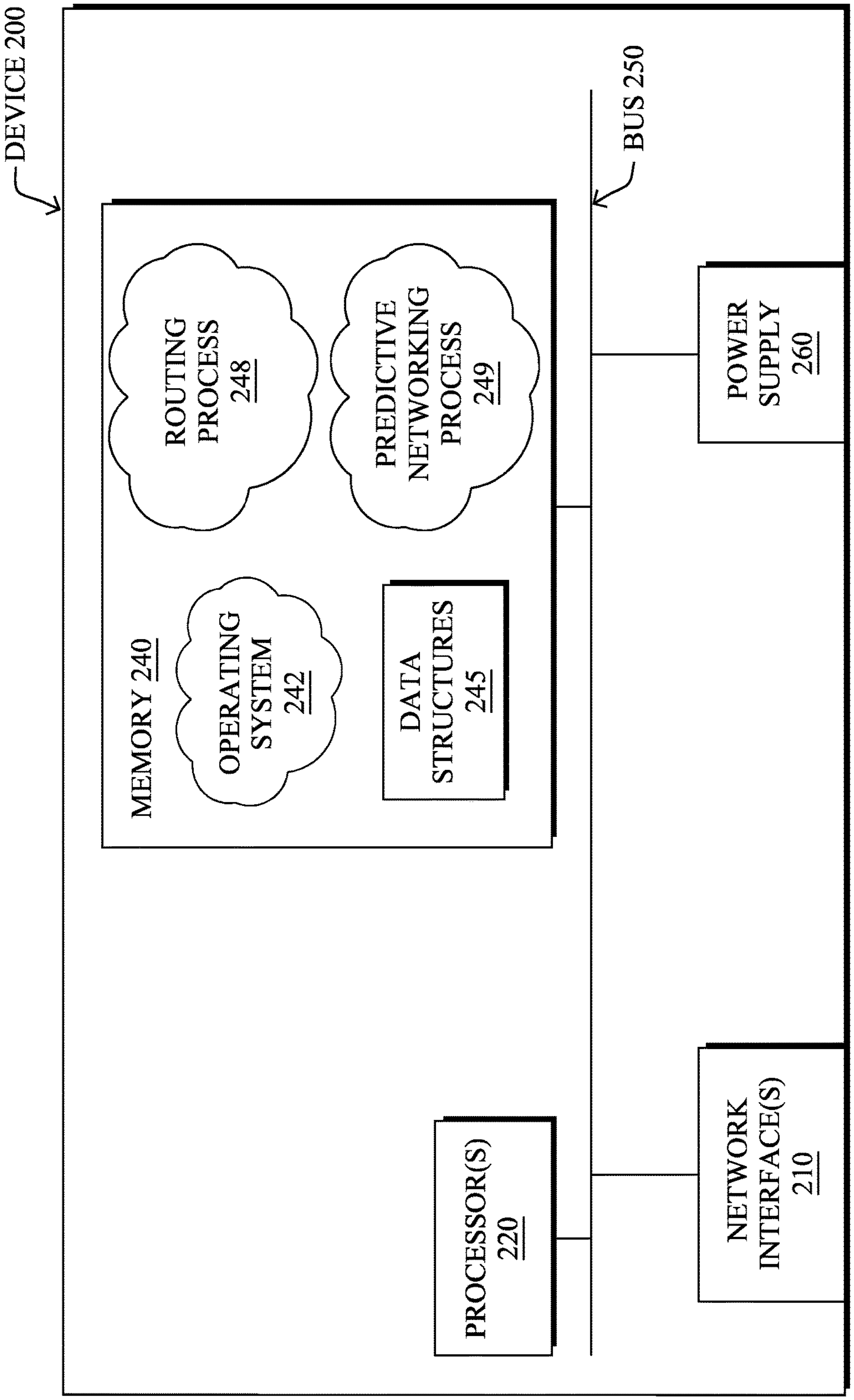
FIG. 2 illustrates an example network device/node.
Figure 3A:
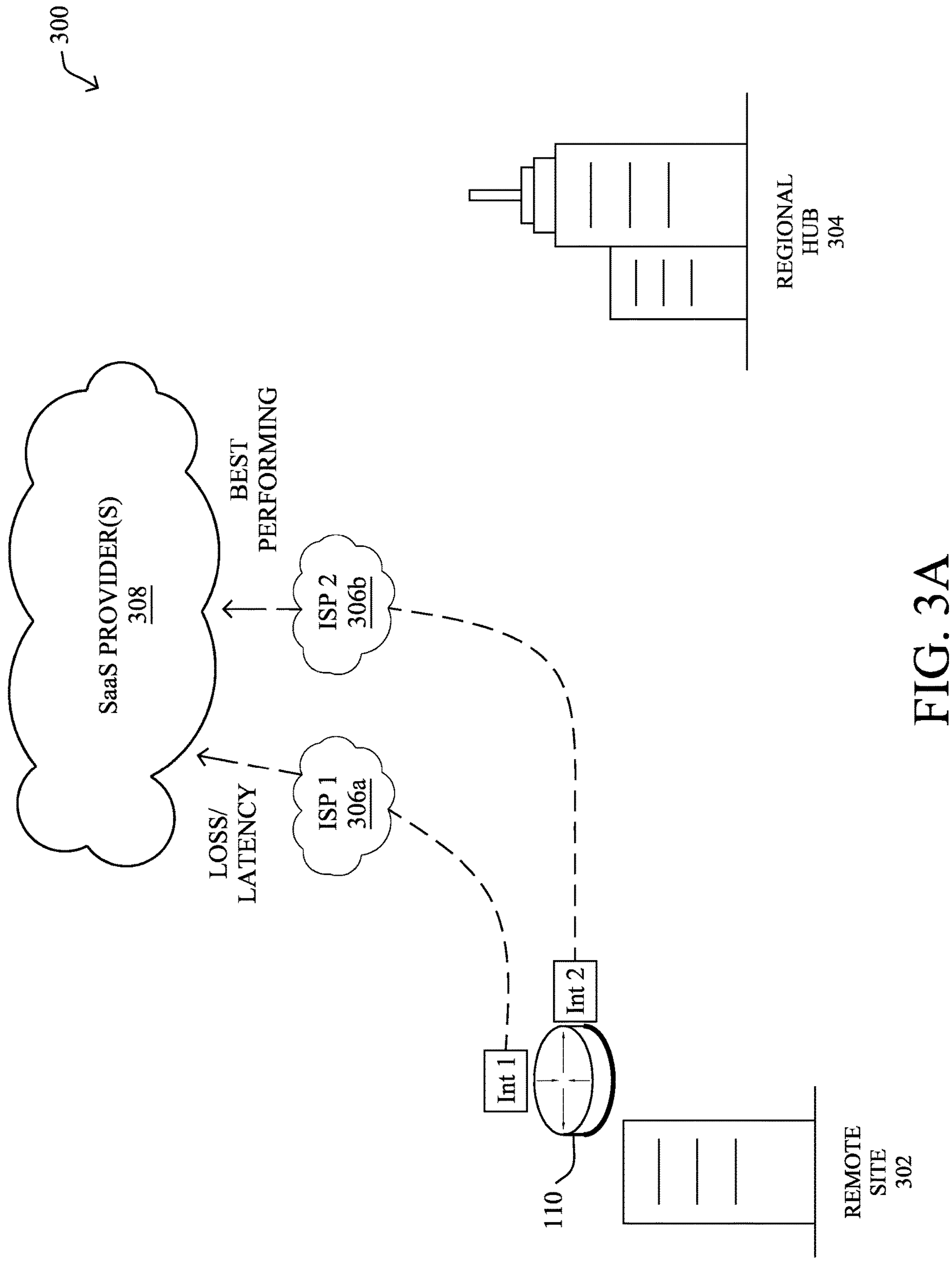
FIGS. 3A-3B illustrate example network deployments.
Figure 3B:
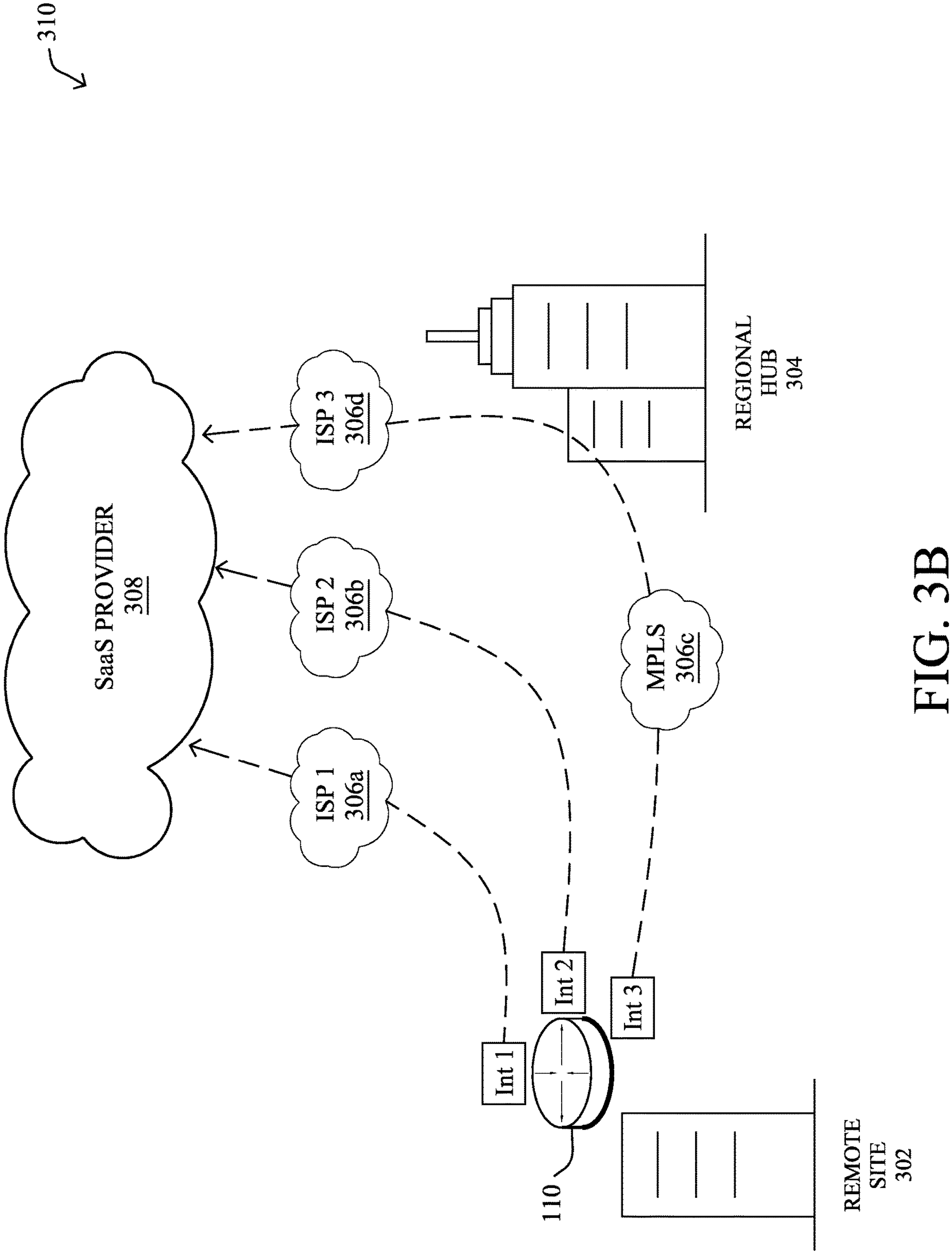

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 248 and/or a predictive networking process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 248 may consist solely of providing mechanisms necessary for source routing techniques. That is, for source routing, other devices in the network can tell the less capable devices exactly where to send the packets, and the less capable devices simply forward the packets as directed.

In further embodiments, routing process 248 may be configured to also support a resilience mechanism, such as fast reroute (FRR). As would be appreciated, FRR is a term of art and refers to a specific networking technology that exists to reactively recover from a failure along a network path by rerouting traffic from that path onto a pre-established backup path. Example FRR mechanisms include, for instance, MPLS FRR, such as MPLS Traffic Engineering (TE) FRR, and Internet Protocol (IP) FRR. Such mechanisms have been shown to be capable of reacting to detected failures on the order of milliseconds. including the detection of the failure and traffic rerouting along a next-hop (link protection) or next-next-hop (node protection) backup path/tunnel. Such backup paths may be provisioned without bandwidth guarantees or with bandwidth guarantees (e.g., as in the case of MPLS TE FRR with "bandwidth protection"), whereby backup paths may be computed on-line using Constrained Shortest Path First (CSPF) or via a Path Computation Element (PCE) in the network.

In various embodiments, as detailed further below, routing process 248 and/or predictive networking process 249 may also include computer executable instructions that, when executed by processor(s) 220, cause device 200 to perform the techniques described herein. To do so, in some embodiments, routing process 248 and/or predictive networking process 249 may utilize artificial learning/machine learning. In general, artificial intelligence/machine learning is concerned with the design and the development of techniques that take as input empirical data (such as network statistics and performance indicators), and recognize complex patterns in these data. One very common pattern among these techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 248 and/or predictive networking process 249 may employ one or more supervised, unsupervised, or semi-supervised machine learning models. Generally, supervised learning entails the use of a training set of data, as noted above, that is used to train the model to apply labels to the input data. For example, the training data may include sample data that has been labeled as indicative of acceptable user experience or poor user experience. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 248 and/or predictive networking process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the quality of service (QOS) of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, one common factor among traditional recovery mechanisms in a network is that they are all reactive in nature, meaning that rerouting of traffic onto a backup path is only possible after receiving signaling that there is a link or node failure along the primary path. In addition, these techniques are also completely agnostic as to the quality of experience (QoE) of any given application whose traffic is routed over the failed path.

Predictive routing itself has become possible in recent years, thanks to advances in machine learning/artificial intelligence. This allows for path failures to be predicted in advance of them actually occurring and for corrective measures to be taken. However, these predictions have also operated on relatively large timescales, on the order of dozens of minutes, if not hours or days. Thus, predictive routing has been traditionally unsuitable for use with fast reroute mechanisms, which have operated on the order of milliseconds for recovery. Recently, though, real time prediction (RTP) has emerged, whereby issues (e.g., failures) can be forecast several seconds in advance of the issues actually occurring.

——Predictive Fast Reroute——

The techniques introduced herein allow for a fast reroute (FRR)-enabled router in a network to interact with a predictive routing system, so as to leverage RTP and proactively initiate a fast reroute action in advance of a predicted failure. In some aspects, the router may also monitor the performance of the path, in order to assess the efficacy of the reroute. Said differently, the techniques herein present a fundamental shift in FRR mechanisms, changing their operations from being reactive in nature to being proactive in nature.

Illustratively, the techniques described herein may be performed by hardware, software, and/or firmware, such as in accordance with predictive networking process 249, which may include computer executable instructions executed by the processor 220 (or independent processor of interfaces 210) to perform functions relating to the techniques described herein, such as in conjunction with routing process 248.

Specifically, according to various embodiments, a router in a network reports, a supervisor, capabilities of the router to support fast reroute. The router receives a prediction model from the supervisor that is able to predict failures along a path in the network. The router predicts, using the prediction model, a failure along a primary path in the network that is currently being used by the router to send traffic. The router performs, in advance of the failure predicted by the router, a fast reroute of at least a portion of the traffic from the primary path to a backup path in the network.

Figure 4:
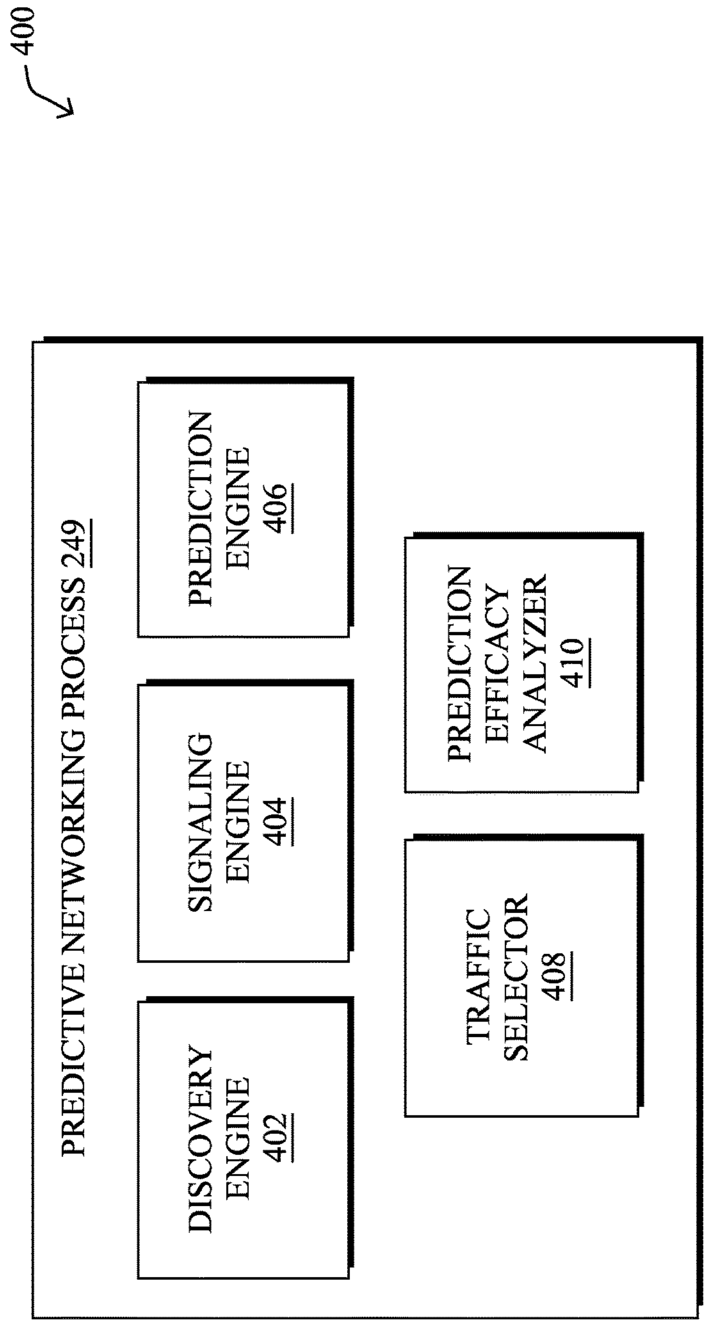
FIG. 4 illustrates an example architecture for a predictive networking process.

Operationally, in various embodiments, FIG. 4 illustrates an example architecture for a predictive networking process, according to various embodiments. At the core of architecture 400 is predictive networking process 249, which may be executed by a controller for a network (e.g., a supervisor), a networking device (e.g., a router), another device in communication therewith, or a combination thereof.

As shown, predictive networking process 249 may include any or all of the following components: a discovery engine 402, a signaling engine 404, a prediction engine 406, a traffic selector 408, and/or a prediction efficacy analyzer 410. As would be appreciated, the functionalities of these components may be combined or omitted, as desired (e.g., implemented as part of predictive networking process 249). In addition, these components may be implemented on a singular device or in a distributed manner, in which case the combination of executing devices can be viewed as their own singular device for purposes of executing predictive networking process 249.

In various embodiments, discovery engine 402 may be configured to perform a discovery process whereby a supervisor in the network is able to discover FRR-capable routers in the network that can support predictive FRR using the techniques herein. Thus, when executed on a particular router, discovery engine 402 may be responsible for reporting the FRR capabilities of the router to the supervisor. Conversely, when executed by the supervisor, discovery engine 402 may be configured to collect such reporting from any number of routers, to identify their capabilities. This reporting may also be performed on a pull basis whereby a router reports its capabilities in response to a request from the supervisor or on a push basis whereby the router reports its capabilities without first receiving a request.

To perform the reporting, discovery engine 402 may indicate the capabilities of its executing router (e.g., whether the routing process 248 of the router supports FRR and/or modification of its FRR mechanism to be predictive) within an IGP message. For instance, the indication could take the form of a custom flag added to the OSPF or ISIS advertisements sent by the router, in various embodiments. For instance, the indication may be indicated within a custom type-length-value (TLV) of an OSPF advertisement or sub-TLV of an ISIS advertisement, such as by reserving the fifth bit to indicate the ability of the router to support the predictive techniques herein.

Signaling engine 404 may be responsible for handling the exchange of information between an FRR-capable router, such as a P or PE router, and the supervisor, which is responsible for training prediction models to predict failures in the network. As would be appreciated, in MPLS, P routers are not customer facing and only support MPLS, whereas PE routers are customer facing and can support both IP and MPLS. More specifically, the signaling engine 404 of any given router may report the local state of the router to the supervisor, whereas signaling engine 404 may be responsible for using this information to train and send a suitable prediction model back to the router.

Regarding the local state of the router, the information provided by signaling engine 404 may include information about the backup path pre-established by the router for a given primary path, the bandwidth allocated to the backup path, other information about the operation of the FRR mechanism of the router, or the like. For instance, in a simple FRR implementation, the router may leverage MPLS TE FRR with a zero bandwidth (0-BW) mode of operation to provision a backup path/tunnel with zero bandwidth. In contrast, a more complex FRR mechanism may implement both link and node protection with bandwidth protection (i.e., to guarantee an amount of bandwidth on the backup path) through the use of a Path Computation Element (PCE), which computes a set of next hops (NHOP) and next-next hops (NNHOP) for the router.

In various embodiments, the above information provided by signaling engine 404 may be used as part of the factors that influence the prediction model used to predict a failure of the primary path of an FRR-capable router. For instance, the prediction model may be more likely to issue a recommendation for a router to reroute its traffic, should there exist a backup tunnel with guaranteed capacity than over a best-effort link. In other words, in some embodiments, the prediction model to be assigned to the router may not only be configured to predict a failure or other issue over a specific node, link, segment, etc., but may be further configured to also predict whether any rerouted traffic is also likely to experience a failure, as well, when making its recommendations. Thus, knowing whether the local node has alternative NHOP or NNHOP backup tunnels with bandwidth guarantees can greatly affect the performance of the predictive networking system.

According to various embodiments, prediction engine 406 may include a prediction model that is trained by the supervisor to predict whether a failure or other issue is going to occur on a specific link or two-hop path in the network. To do so, the model may leverage real time prediction (RTP), in some embodiments. Such a prediction may, for instance, take the form of a binary value (e.g., 'failure predicted' or 'failure not predicted') or a probability of the failure occurring. In some embodiments, a predicted failure could also take the form of a predicted service level agreement (SLA) violation, resulting in a predicted SLA violation (PSLAV) value. In such a case, the prediction model may compare the PLSAVi (PSLAV for link i) to the PSLAV values for any backup tunnels, to determine whether FRR of the traffic to the backup(s) should be triggered or not. In other words, if a backup path has a higher probability of exhibiting an SLA violation than the primary/current path, the model may opt not to recommend rerouting the traffic. A key aspect of the techniques herein is that execution of the prediction model is done on the router itself, allowing it to very quickly predict and adapt to changing network conditions, although the model itself could be trained elsewhere, such as by the supervisor in the cloud.

In various embodiments, traffic selector 408 may be configured to select the portion of the traffic to be rerouted onto the FRR backup path. This allows for the router to predictively reroute traffic associated with certain applications, which could be identified using deep packet inspection (DPI), specific QoS bit values, tags, or the like. Indeed, RTP may not be available for all of the different types of traffic routed on the current path (e.g., leaving those types of traffic to be rerouted using reactive FRR, instead), meaning that the router may only proactively reroute a portion of the total traffic from its primary path to its backup path.

In further embodiments, prediction efficacy analyzer 410 may be configured to assess the efficacy of any FRR actions triggered by prediction engine 406. One of the key challenges with predictive networking lies in the ability to determine whether a predictive action leading to a recommendation by prediction engine 406 (e.g. to proactively reroute traffic R onto an alternate path) was indeed correct (e.g., whether the prediction was a false positive). In some cases, prediction engine 406 may also take into account a confidence metric associated with any of its failure predictions and/or the risk/impact of any reroute recommendations. Thus, prediction efficacy analyzer 410 may operate in conjunction with prediction engine 406 to determine whether the predicted failure actually occurred, what the QoS or QoE impact actually was for the traffic proactively rerouted onto the backup path, or the like.

In the case of predictive FRR, the alternate paths onto which the traffic is proactively rerouted is short and local (along a NHOP or NNHOP backup tunnel, called B (Backup tunnel)). Before following through with any recommendation from prediction engine 406 to reroute traffic onto a backup path B, prediction efficacy analyzer 410 may perform any or all of the following actions:

- Start active probing along the backup tunnel B at high frequency (used as a baseline)
- Triger the proactive reroute along B according to the recommendation provided by prediction engine 406 (T ms before the time at which the failure/issues has been forecasted).
- Right after rerouting, continuing sending fast probes and record the networking metrics as requested by prediction engine 406.
- Send the collected telemetry from the probing to prediction engine 406 for before and after the reroute.

For the sake of illustration, a number of telemetry variables could be provided such as the delay, loss, and/or jitter (and how they compare to the ones over the link before rerouting) but also local variables such as the queueing system (waiting times, activation of drops with weighted random early detection, etc.) for the traffic being rerouted. Such telemetry is fundamental for prediction efficacy analyzer 410 to assess the efficacy of the predictions by prediction engine 406. This allows prediction efficacy analyzer 410 to better assess whether 1.) the predicted failure issue happened (links failed, link experienced higher loss, delays, etc.), and/or 2.) whether the expected QoS of the backup path was observed. In many circumstances, an incorrect prediction (e.g., a failure did not take place along the primary path) could be largely mitigated/ignored if the traffic is rerouted along a path offering similar performance.

In yet another embodiment, prediction efficacy analyzer 410 may cause the local router R to keep sending probes (potentially at higher frequency) along the link for which a failure/issue was predicted by prediction engine 406, to also assess whether the prediction was a false positive.

Figure 5A:
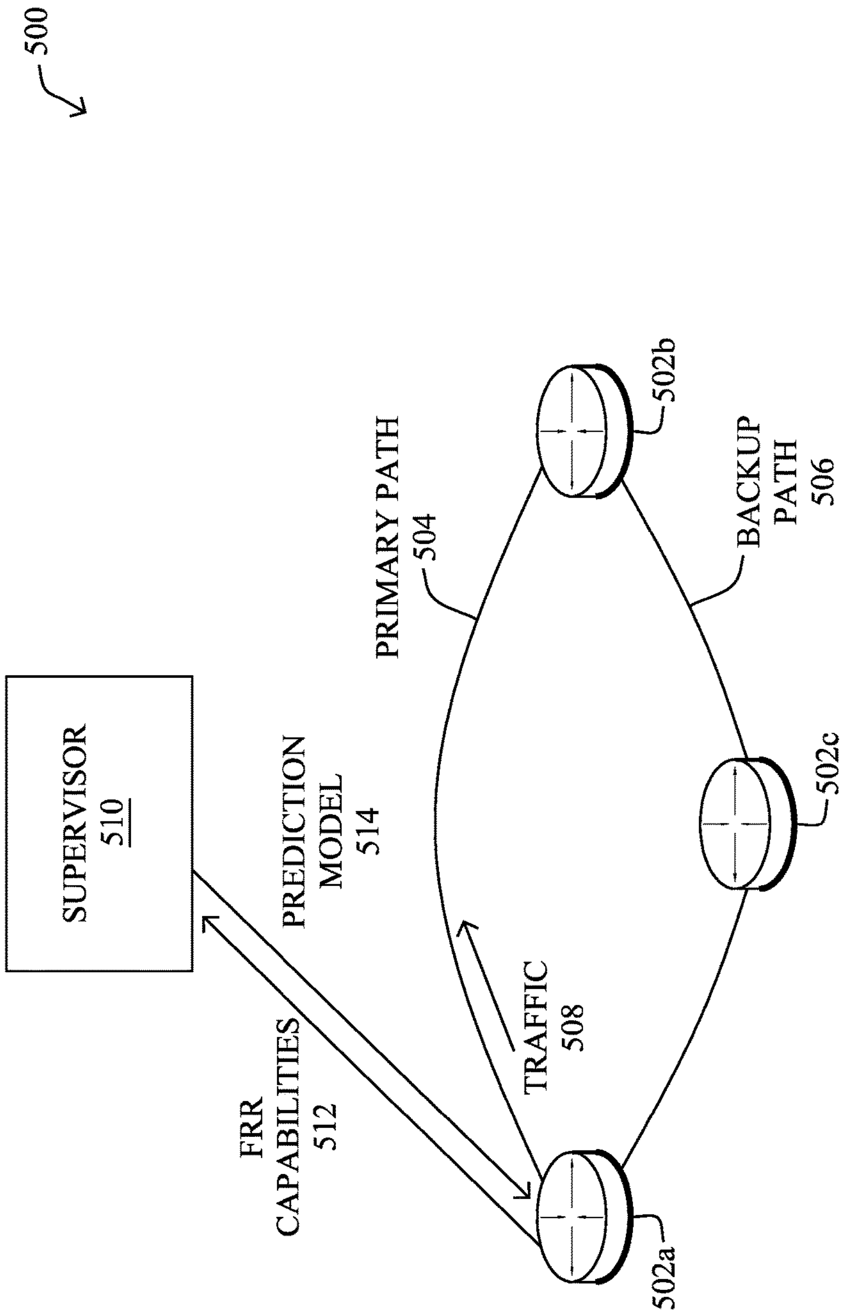
FIGS. 5A-5C illustrate an example of a router performing predictive fast reroute.
Figure 5B:
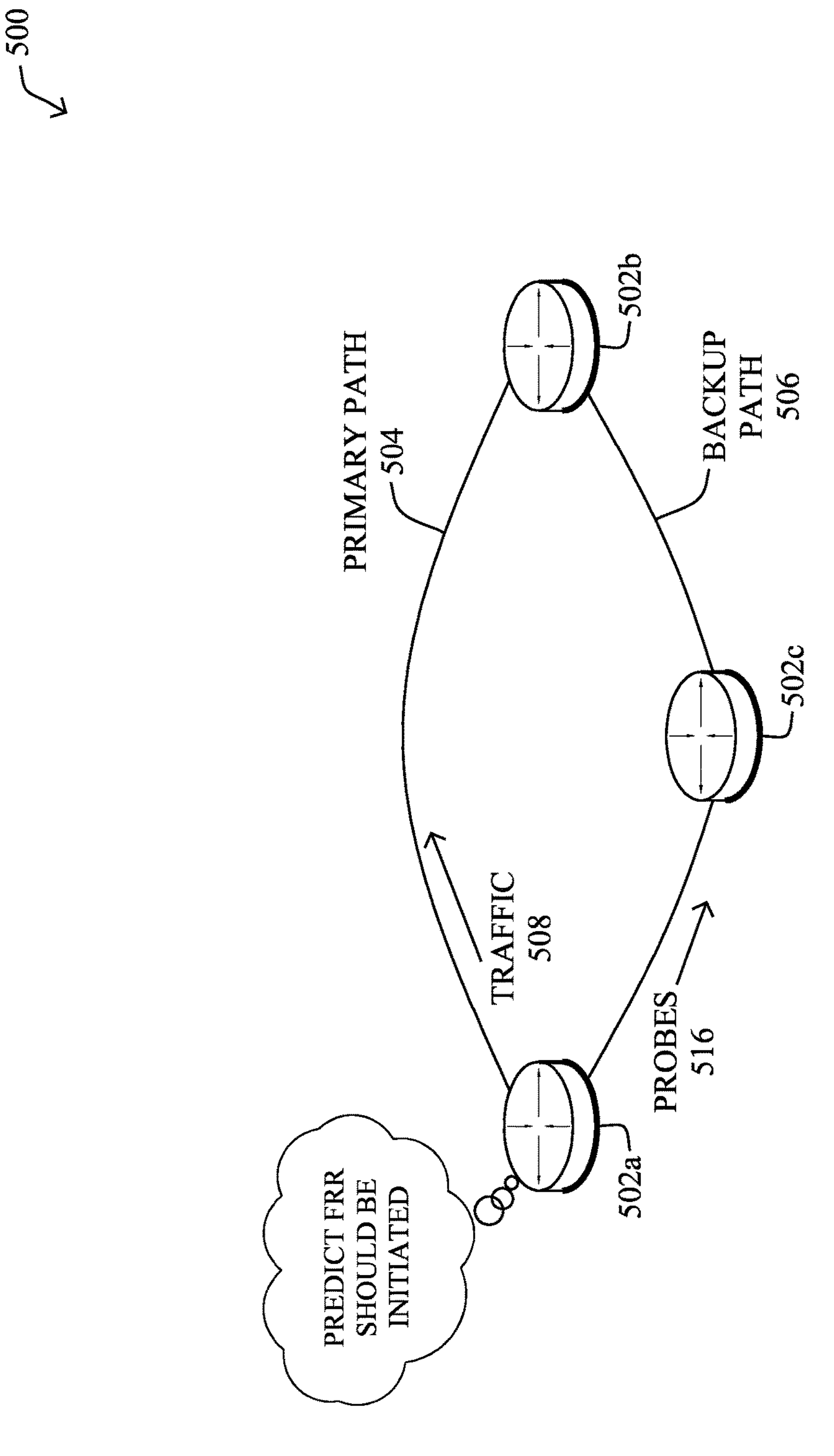
Figure 5C:
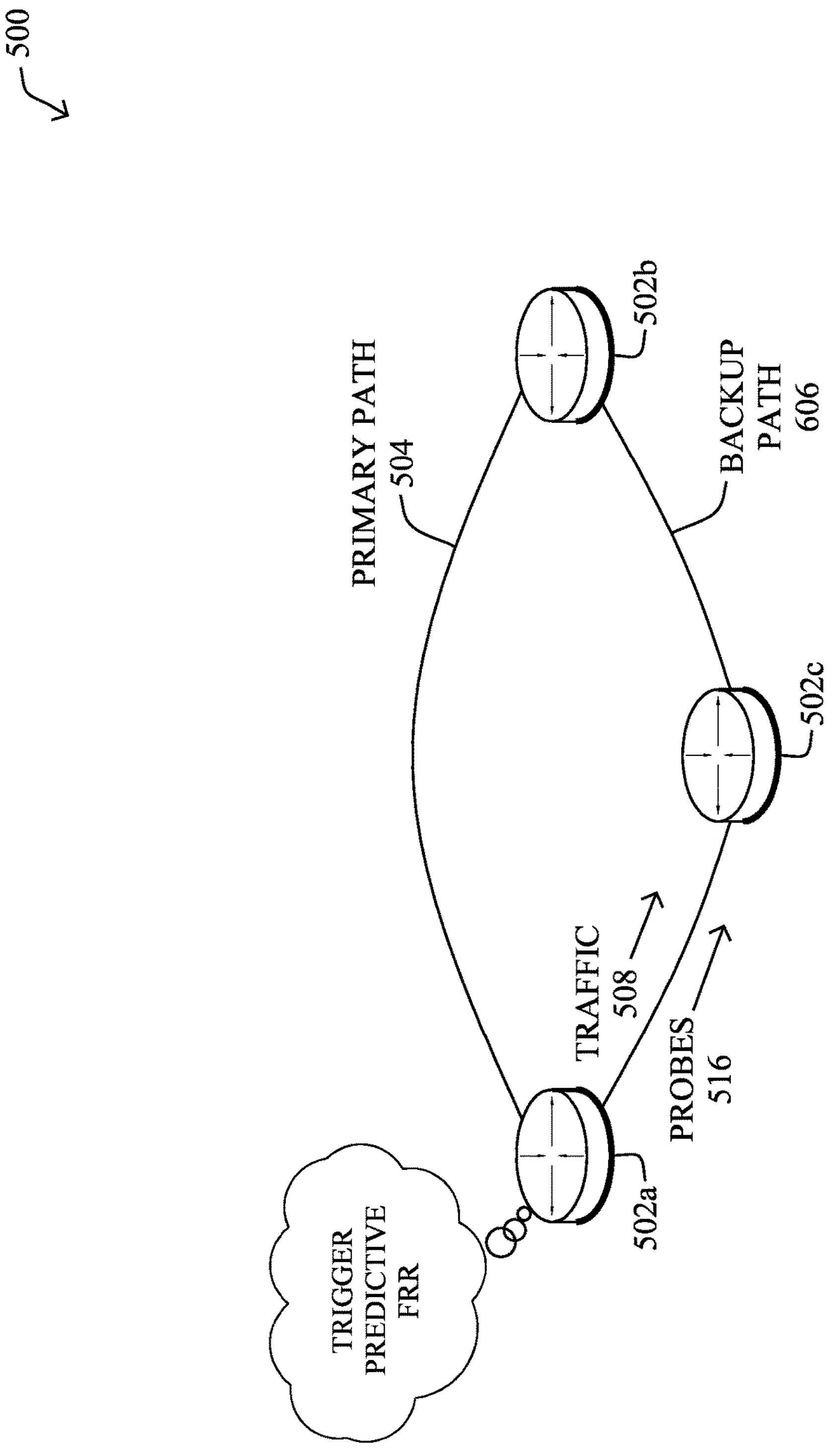

FIGS. 5A-5C illustrate an example 500 of a router performing predictive fast reroute, in accordance with the teachings herein. As shown, assume that a router **502*a* shares interfaces/links with two other routers: router 502*b* and router 502*c*, and that its current, primary path 504 extends along the link that it shares with router 502*b*. Through the use of its FRR mechanism (e.g., MPLS FRR or IP FRR), router 502*a* may also have a configured backup path 506 that extends over its interface/link with router 502*c* which, in turn, shares another interface/link with router 502*b*. Thus, backup path 506 may be used in the case of a link failure of the link that connects router 502*a* and router 502*b*. Of course, other types of backup paths could also be pre-configured using the FRR mechanism, such as a backup path that entirely bypasses router 502*b*, in the case of a node failure instead of a link failure. Here, router 502*a* may simply send its traffic via primary path 504 towards 502*b*** under normal circumstances.

As shown, router **502*a* may report its FRR capabilities 512 to a supervisor 510, through execution of its discovery engine 402. This allows supervisor 510 to learn which router(s) in the network are capable of performing the predictive FRR introduce herein. Based on the indicated capability to do so, supervisor 510 may train a prediction model 514 that is configured to predict a failure such as a failure of the link between router 502*a* and router 502*c*, a failure of router 502***c* and/or other nodes along primary path 504, an SLA violation by primary path 504 (e.g., with respect to traffic for a certain application), or the like.

As shown in FIG. 5B, router 502*a* may use its prediction model 514 to predict that FRR should be initiated. In some instances, such a prediction may only apply to a portion of traffic 508, such as only traffic for certain applications among traffic 408. Regardless, in some embodiments, the prediction itself may trigger router 502*a* to initiate fast probing of backup path 506 by sending probes 516 to measure performance metrics such as jitter, loss, delays, etc. along backup path 506. In some cases, router 502*a* may perform a similar probing of primary path 504, as well. This allows router 502*a* to obtain pre-reroute telemetry regarding backup path 506 (and possibly primary path 504, as well).

As shown in FIG. 5C, router 502*a* may then reroute some or all of traffic 508 onto backup path 606 from primary path 504 using its FRR mechanism, in advance of the predicted failure for primary path 504. In some embodiments, router 502*a* may also continue to send probes 516 along backup path 606 (and possibly primary path 504), thereby allowing it to quickly assess the efficacy of the prediction/recommendation to reroute traffic 508. Doing so may allow the predictive FRR mechanism to be disabled in the case of poor performance, retraining of the model to be initiated, or the like.

Figure 6:
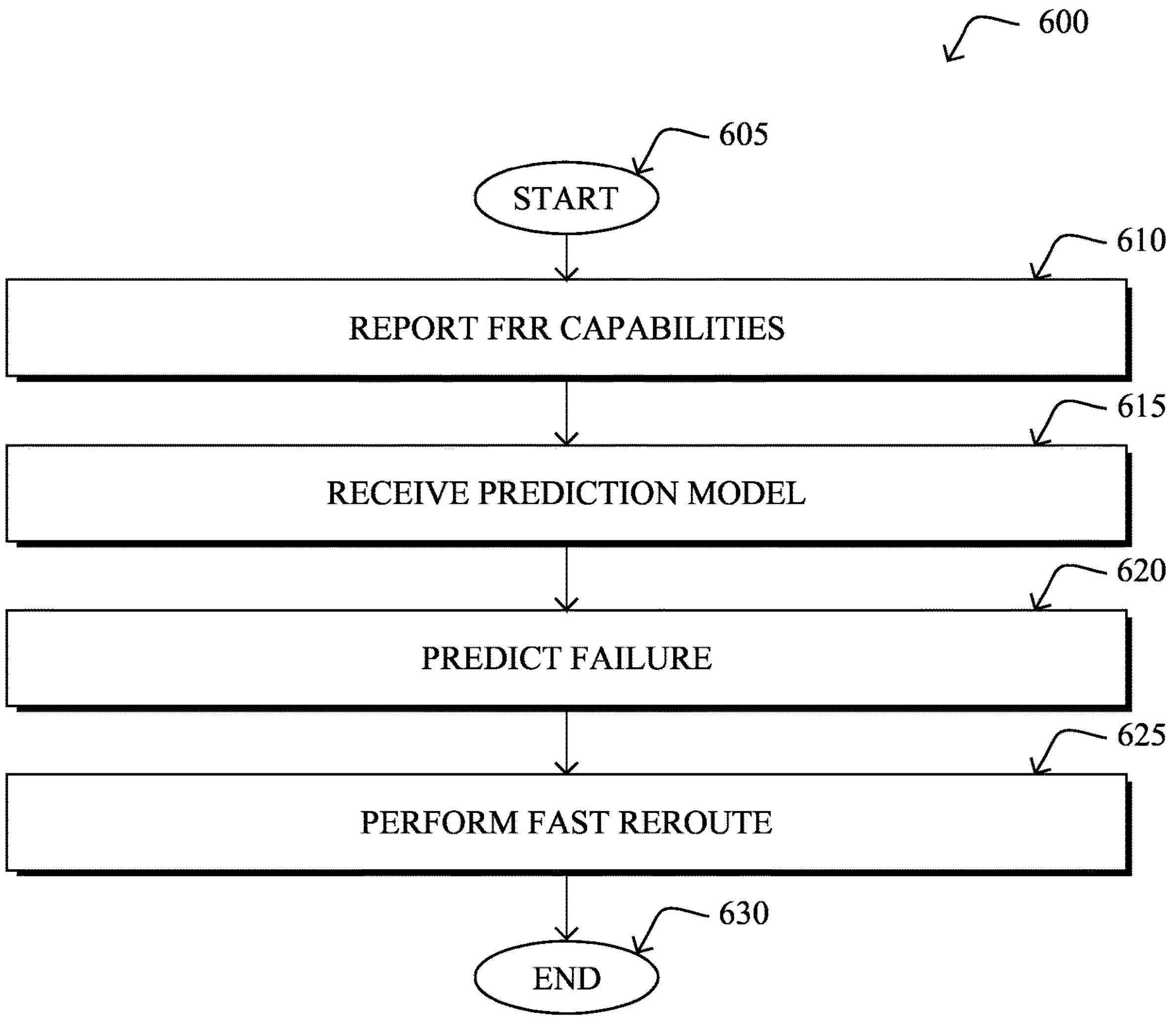
FIG. 6 illustrates an example simplified procedure for performing predictive fast reroute in a network.

FIG. 6 illustrates an example simplified procedure 600 (e.g., a method) for performing a predictive fast reroute in a network, in accordance with one or more embodiments described herein. For example, a non-generic, specifically configured device (e.g., device 200), such as a router or other device in communication therewith, may perform procedure 600 by executing stored instructions (e.g., predictive networking process 249). The procedure 600 may start at step 605, and continues to step 610, where, as described in greater detail above, the router may report to a supervisor, capabilities of the apparatus to support fast reroute. In some embodiments, the router is a P router or a provider edge (PE) router. In another embodiment, the router uses Multiprotocol Label Switching Fast Reroute (MPLS FRR) to perform the fast reroute. In a further embodiment, the router uses Internet Protocol (IP) Fast Reroute (IP FRR) to perform the fast reroute. In some embodiments, the capabilities of the router to support fast reroute are reported by the router to the supervisor via a routing protocol message, such as an Open Shortest Path First (OSPF), Intermediate-System-to-Intermediate-System (ISIS), or other routing protocol message. In some embodiments, the backup path is a tunnel in the network pre-established by the router before predicting the failure of the primary path.

At step 615, as detailed above, the router may receive a prediction model from the supervisor that is able to predict failures along a path in the network. For instance, such failures may be service level agreement (SLA) violations, an inability of the path to provide acceptable user experience for an application whose traffic is routed via the path, a link failure, or a node failure.

At step 620, the router may predict, using the prediction model, a failure along a primary path in the network that is currently being used by the apparatus to send traffic, as described in greater detail above. In some embodiments, the failure predicted by the router is a predicted violation of a service level agreement (SLA) by the primary path. In another embodiment, the failure predicted by the router is a predicted failure of a link or node along the primary path. In a further embodiment, the router may also select the portion of the traffic to be fast rerouted onto the backup path based on one or more applications associated with it.

At step 625, as detailed above, the router may perform, in advance of the failure predicted by the apparatus, a fast reroute of at least a portion of the traffic from the primary path to a backup path in the network. In some embodiments, the router may also obtain pre-reroute telemetry by probing the backup path in response to predicting the failure and obtain post-reroute telemetry by continuing to probe the backup path after performing the fast reroute to the backup path. In a further embodiment, the router also determines a performance of the prediction model based on the pre-reroute telemetry and on the post-reroute telemetry.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for a predictive fast reroute mechanism in a network, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

reporting, by a router in a network and to a supervisor, capabilities of the router to support fast reroute and local state information for a backup path for a primary path used by the router, the local state information including whether the backup path provides a bandwidth guarantee;

receiving, at the router, a prediction model from the supervisor that is able to predict failures along a path in the network, the prediction model having been trained by the supervisor using the local state information reported by the router;

executing, by the router, the prediction model to predict a failure along the primary path in the network that is currently being used by the router to send traffic and to generate a fast reroute recommendation indicating whether to fast reroute at least a portion of the traffic from the primary path to the backup path based on a prediction by the prediction model of whether traffic rerouted from the primary path to the backup path would experience a failure or service level agreement violation on the backup path; and responsive to the fast reroute recommendation, performing, by the router and in advance of the failure predicted by the router, a fast reroute of at least a portion of the traffic from the primary path to the backup path in the network.

2. The method as in claim 1, wherein the router is a P router or a provider edge (PE) router.

3. The method as in claim 1, wherein the router uses Multiprotocol Label Switching Fast Reroute (MPLS FRR) to perform the fast reroute.

4. The method as in claim 1, wherein the router uses Internet Protocol (IP) Fast Reroute (IP FRR) to perform the fast reroute.

5. The method as in claim 1, further comprising:

obtaining, by the router, pre-reroute telemetry by probing the backup path in response to predicting the failure; and obtaining, by the router, post-reroute telemetry by continuing to probe the backup path after performing the fast reroute to the backup path.

6. The method as in claim 5, further comprising:

determining a performance of the prediction model based on the pre-reroute telemetry and on the post-reroute telemetry.

7. The method as in claim 1, wherein the failure predicted by the router is a predicted violation of a service level agreement (SLA) by the primary path.

8. The method as in claim 1, further comprising:

selecting, by the router, the portion of the traffic to be fast rerouted onto the backup path based on one or more applications associated with it.

9. The method as in claim 1, wherein the capabilities of the router to support fast reroute are reported by the router to the supervisor via an Open Shortest Path First (OSPF) or Intermediate-System-to-Intermediate-System (ISIS) message.

10. The method as in claim 1, wherein the backup path is a tunnel in the network pre-established by the router before predicting the failure of the primary path.

11. An apparatus, comprising:

one or more network interfaces to communicate with a network;

a processor coupled to the one or more network interfaces and configured to execute one or more processes; and a memory configured to store a process that is executable by the processor, the process when executed configured to:

report to a supervisor, capabilities of the apparatus to support fast reroute and local state information for a backup path for a primary path used by the apparatus, the local state information including whether the backup path provides a bandwidth guarantee;

receive, at the apparatus, a prediction model from the supervisor that is able to predict failures along a path in the network, the prediction model having been trained by the supervisor using the local state information reported by the apparatus;

execute, at the apparatus, the prediction model to predict a failure along the primary path in the network that is currently being used by the apparatus to send traffic and to generate a fast reroute recommendation indicating whether to fast reroute at least a portion of the traffic from the primary path to the backup path based on a prediction by the prediction model of whether traffic rerouted from the primary path to the backup path would experience a failure or service level agreement violation on the backup path; and perform, in advance of the failure predicted by the apparatus, a fast reroute of at least a portion of the traffic from the primary path to the backup path in the network.

12. The apparatus as in claim 11, wherein the apparatus is a P router or a provider edge (PE) router.

13. The apparatus as in claim 11, wherein the apparatus uses Multiprotocol Label Switching Fast Reroute (MPLS FRR) to perform the fast reroute.

14. The apparatus as in claim 11, wherein the apparatus uses Internet Protocol (IP) Fast Reroute (IP FRR) to perform the fast reroute.

15. The apparatus as in claim 11, wherein the process when executed is further configured to:

obtain pre-reroute telemetry by probing the backup path in response to predicting the failure; and obtain post-reroute telemetry by continuing to probe the backup path after performing the fast reroute to the backup path.

16. The apparatus as in claim 15, wherein the process when executed is further configured to:

determine a performance of the prediction model based on the pre-reroute telemetry and on the post-reroute telemetry.

17. The apparatus as in claim 11, wherein the failure predicted by the apparatus is a predicted violation of a service level agreement (SLA) by the primary path.

18. The apparatus as in claim 11, wherein the process when executed is further configured to:

select the portion of the traffic to be fast rerouted onto the backup path based on one or more applications associated with it.

19. The apparatus as in claim 11, wherein the capabilities of the apparatus to support fast reroute are reported by the apparatus to the supervisor via a routing protocol message.

20. A tangible, non-transitory, computer-readable medium storing program instructions that cause a router in a network to execute a process comprising:

reporting, by the router and to a supervisor, capabilities of the router to support fast reroute and local state information for a backup path for a primary path used by the router, the local state information including whether the backup path provides a bandwidth guarantee;

receiving, at the router, a prediction model from the supervisor that is able to predict failures along a path in the network, the prediction model having been trained by the supervisor using the local state information reported by the router;

executing, by the router, the prediction model to predict a failure along the primary path in the network that is currently being used by the router to send traffic and to generate a fast reroute recommendation indicating whether to fast reroute at least a portion of the traffic from the primary path to the backup path based on a prediction by the prediction model of whether traffic rerouted from the primary path to the backup path would experience a failure or service level agreement violation on the backup path; and responsive to the fast reroute recommendation, performing, by the router and in advance of the failure predicted by the router, a fast reroute of at least a portion of the traffic from the primary path to the backup path in the network.

* * * * *